United States Patent [19]
Umeda et al.

[11] Patent Number: 4,626,938
[45] Date of Patent: Dec. 2, 1986

[54] TAPE LOADING DEVICE IN A RECORDING AND/OR REPRODUCING APPARATUS

[75] Inventors: Hiroyuki Umeda; Kazutaka Ashida, both of Yokohama, Japan

[73] Assignee: Victor Company of Japan, Ltd., Yokohama, Japan

[21] Appl. No.: 470,715

[22] Filed: Feb. 28, 1983

[30] Foreign Application Priority Data

Mar. 8, 1982 [JP] Japan ................................ 57-36176
Mar. 8, 1982 [JP] Japan ................................ 57-36177
Mar. 10, 1982 [JP] Japan ................................ 57-37369
Mar. 10, 1982 [JP] Japan ........................... 57-33357[U]
Mar. 11, 1982 [JP] Japan ........................... 57-34157[U]
Mar. 11, 1982 [JP] Japan ........................... 57-34158[U]

[51] Int. Cl.⁴ ............................................. G11B 15/66
[52] U.S. Cl. ........................................ 360/95; 360/85
[58] Field of Search ........................... 360/85, 95, 84; 242/200, 201; 74/816, 89

[56] References Cited

U.S. PATENT DOCUMENTS 4,074,574  2/1978  Schubert et al. ...................... 74/89
4,323,936  4/1982  Beitler et al. ........................ 360/85
4,410,919  10/1983  Umeda ................................. 360/85
4,499,513  2/1985  Umeda ................................. 242/200

Primary Examiner—John H. Wolff
Assistant Examiner—Matthew J. Bussan
Attorney, Agent, or Firm—Louis Bernat

[57] ABSTRACT

A tape loading device in a recording and/or reproducing apparatus which has a guide drum with heads for recording and/or reproducing signals onto a tape. A first belt is arranged along a first belt path which has a section extending between the guide drum and a cassette accommodating the tape. A second belt is arranged along a second belt path which has a section extending between the guide drum and the cassette. A driving mechanism drives the first and second belts so that each travels toward the guide drum during a tape loading mode and travels toward the cassette during a tape unloading mode. A pair of tape guide mechanisms are movable in response to the travel of the first and second belts for intercepting the tape within the cassette and for moving to predetermined positions in the vicinity of the guide drum during the tape loading mode to guide the tape at the predetermined positions. The tape travels along a predetermined tape path with respect to the guide drum. Guide paths guide the pair of tape guide mechanisms so that the tape guide mechanisms move along predetermined moving paths.

11 Claims, 18 Drawing Figures

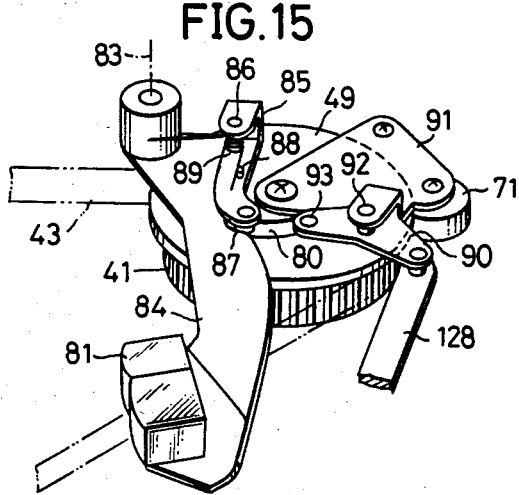
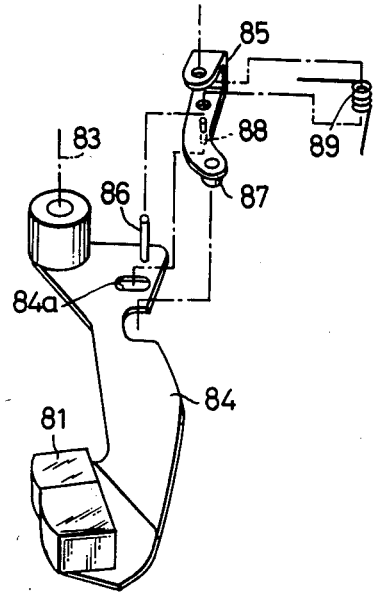
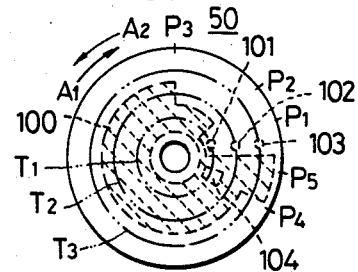

TAPE LOADING DEVICE IN A RECORDING AND/OR REPRODUCING APPARATUS

BACKGROUND OF THE INVENTION

The present invention generally relates to tape loading devices in recording and/or reproducing apparatuses, and more particularly to a tape loading device comprising a pair of members for drawing out a tape within a cassette in a recording and/or reproducing apparatus to load the tape unto a predetermined tape path and a pair of loop-shaped bands or belts for moving the pair of members, wherein a pair of rotary bodies for driving the pair of belts to travel are arranged coaxially.

Conventionally, there was a tape loading device for drawing out a magnetic tape from within a cassette which is loaded into a predetermined position inside a magnetic recording and/or reproducing apparatus, and load the tape unto a predetermined tape path in the recording and/or reproducing apparatus. In this conventional device, a pair of belts (endless timing belts) are driven to travel so as to move a pair of loading poles to predetermined positions outside the cassette from positions within the cassette. The tape within the cassette is intercepted by these loading poles and drawn out of the cassette, and the tape is finally loaded unto the predetermined tape path making contact with a guide drum comprising heads. An example of this type of a conventional tape loading device is disclosed in a U.S. patent application Ser. No. 241,254 filed Mar. 6, 1981 in which the assignee is the same as that of the present application.

However, in the above described conventional tape loading device, a pair of timing gears for driving the respective timing belts are provided independently on both sides of the guide drum. Accordingly, a space is independently required in the plan view of the recording and/or reproducing apparatus, for each of the pair of timing gears. Therefore, there was a problem in that it was difficult to downsize the tape loading device and hence downsize the recording and/or reproducing apparatus comprising the tape loading device.

SUMMARY OF THE INVENTION

Accordingly, it is a general object of the present invention to provide a novel and useful tape loading device in a recording and/or reproducing apparatus, in which the above described problems have been overcome.

Another and more specific object of the present invention is to provide a tape loading device, in which a pair of rotary bodies for independently driving a pair of tape draw-out members to travel are provided coaxially. According to the device of the present invention, the overall size of the recording and/or reproducing apparatus can be effectively reduced.

Still another object of the present invention is to provide a tape loading device in which rotary bodies respectively comprising coaxially supported cam discs, are provided coaxially, and mechanisms related to the tape loading operation are operated by these cam discs as these cam discs rotate.

Other objects and further features of the present invention will be apparent from the following detailed description when read in conjunction with the accompanying drawings.

BRIEF DESCRIPTION OF THE DRAWINGS

FIG. 15 is a perspective view showing an audio and control head support mechanism in the apparatus shown in FIG. 1;

FIG. 16 is a perspective view showing a part of the mechanism shown in FIG. 15 in a disassembled state; and FIG. 17 is a plan view showing the rotary angle detecting disc shown in FIG. 8 in a rotary position before the tape loading operation is carried out, in correspondence with light-emitting and light-receiving elements.

DETAILED DESCRIPTION

Figure 1:
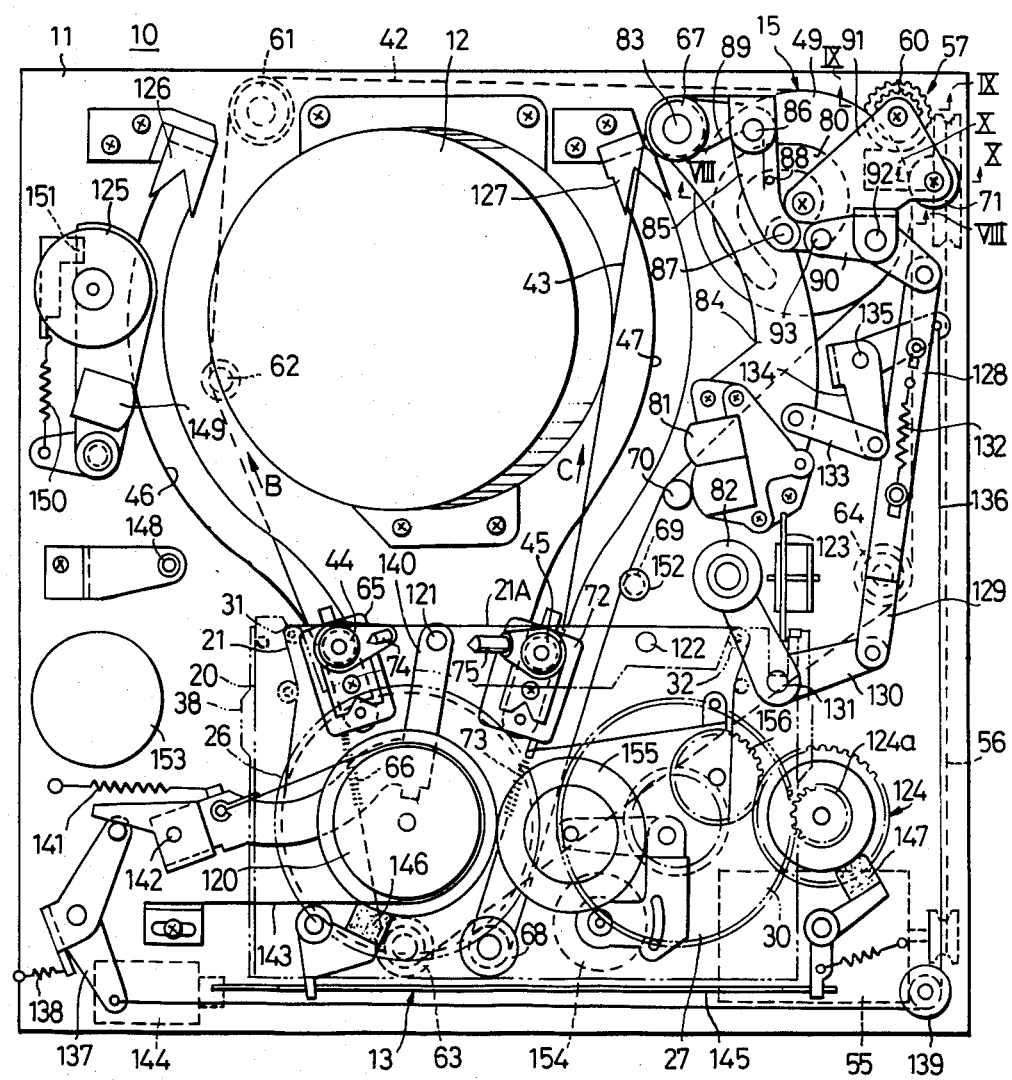
FIG. 1 is a plan view showing an embodiment of a tape loading device according to the present invention together with a recording and/or reproducing apparatus applied with this embodiment of a tape loading device, in a state before loading of a tape.
Figure 2:
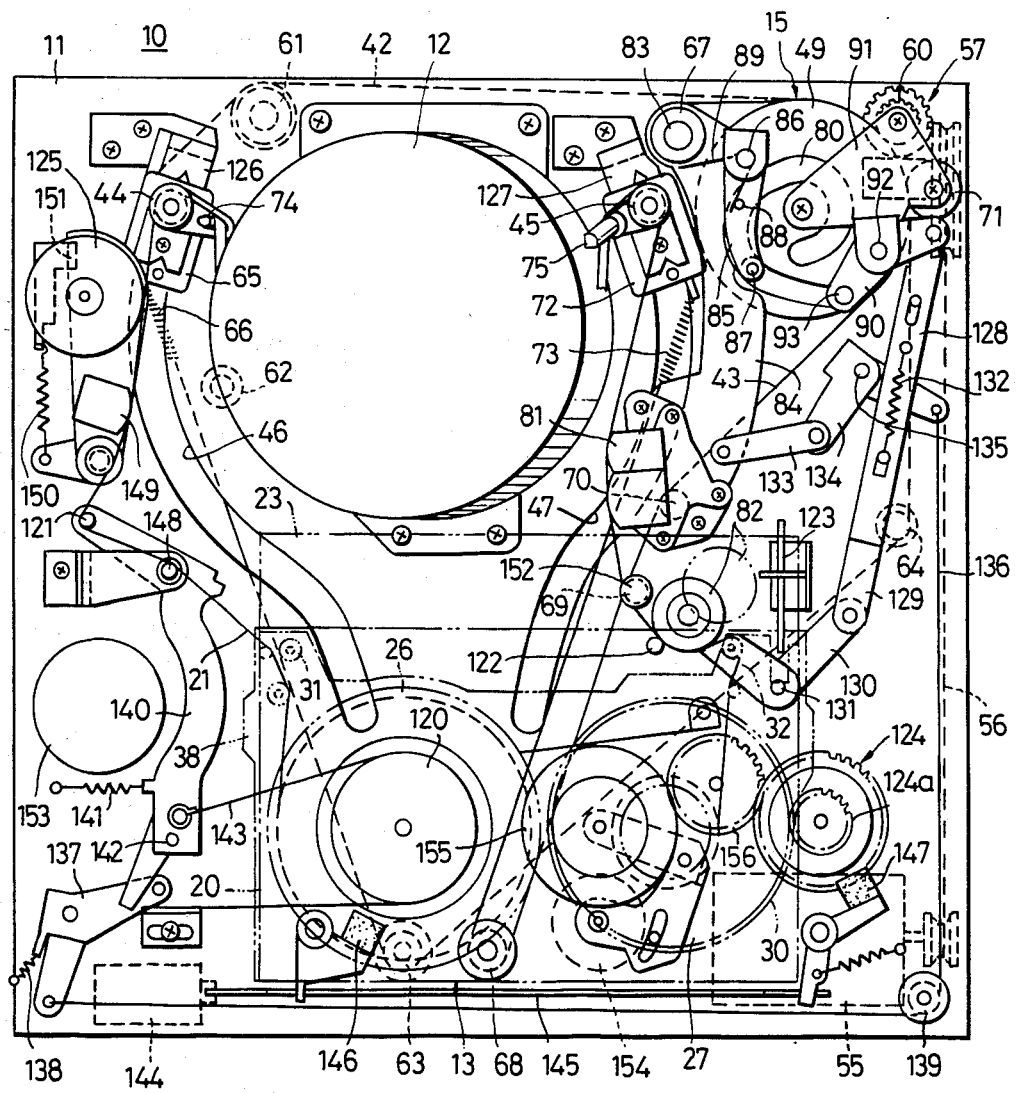
FIG. 2 is a plan view showing the apparatus shown in FIG. 1 in a recording or reproducing mode after completion of the tape loading.

In FIGS. 1 and 2, a recording and/or reproducing apparatus 10 applied with a tape loading device according to the present invention, is directly loaded with a tape cassette which is smaller than a standard type tape cassette. The apparatus 10 is constructed substantially by providing a guide drum 12, a cassette loading part 13, and providing a tape loading mechanism 15 shown in FIG. 3 which constitutes an essential part of the present invention and the like above and underneath the chassis 11.

Figure 4:
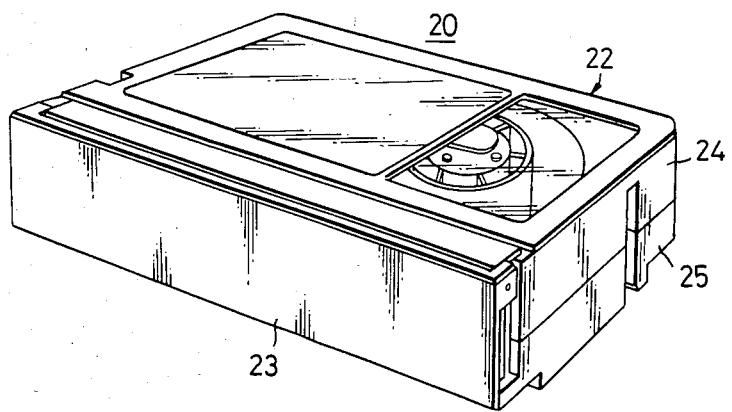
FIG. 4 is a perspective view from above, showing a miniature type tape cassette which may be applied to the tape loading device in the apparatus shown in FIG. 1.
Figure 5:
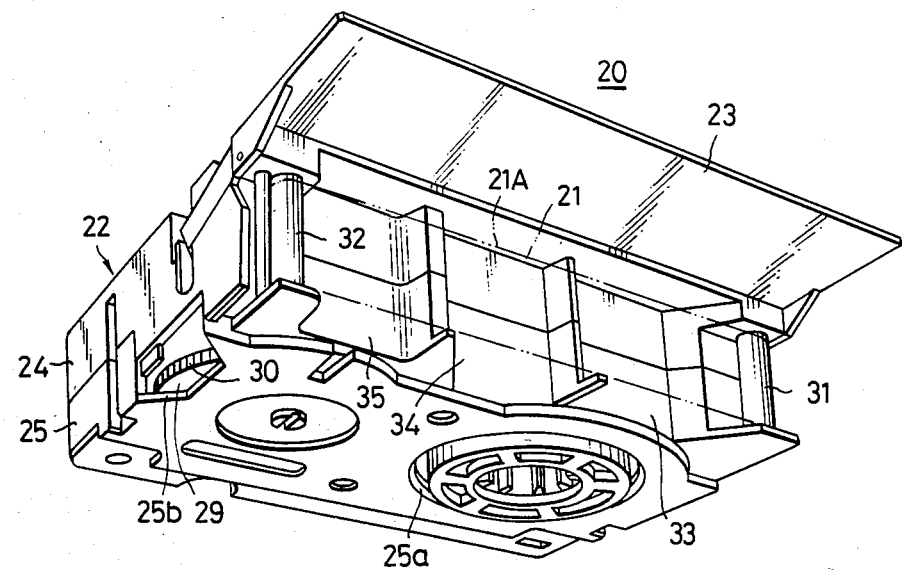
FIG. 5 is a perspective view from below, showing the miniature type tape cassette shown in FIG. 4 in a state where a lid of the tape cassette is open.

First, a miniature type tape cassette 20 having a construction which will be described hereinafter, is loaded into a predetermined position within the appartus 10. As shown in FIGS. 4 and 5, the miniature type tape cassette 20 consists of a cassette case 22 accommodating a magnetic tape 21, and a lid 23 provided at the front of the cassette case 22 in a state where the lid 23 is free to open and close. The cassette case 22 is assembled of an upper half 24 and a lower half 25. The lid 23 pivots between a closed position indicated in FIG. 4 and an open position indicated in FIG. 5, and is held at the above two positions with a detent action.

A supply reel 26 and a take-up reel 27 are provided side by side inside the cassette case 22. The supply reel 26 is formed with a reel driving shaft inserting part, and this reel driving shaft inserting part is provided in a state where the reel driving shaft inserting part is exposed through an opening 25a in the lower half 25. The take-up reel 27 is fitted over a fixed shaft 28 which is embeddedly provided on the lower half 25, in a freely rotatable manner. A gear part 30 is formed at the peripheral part of a lower flange of the take-up reel 27. A part of the gear part 30 is exposed through a window 25b which is extending from the side to bottom of the lower half 25.

The magnetic tape 21 is guided by guide poles 31 and 32, and forms a tape path 21A along the front of the cassette case 22.

Cutouts 33, 34, and 35 are formed at the front of the cassette case 22. As shown in FIGS. 1 and 2, the tape cassette 20 is inserted within a cassette housing 38, and loaded into the cassette loading part 13.

Next, description will be given with respect to the tape loading mechanism and mechanisms related to the tape loading mechanism, by referring to FIGS. 3, and 6 through 17.

Figure 3:
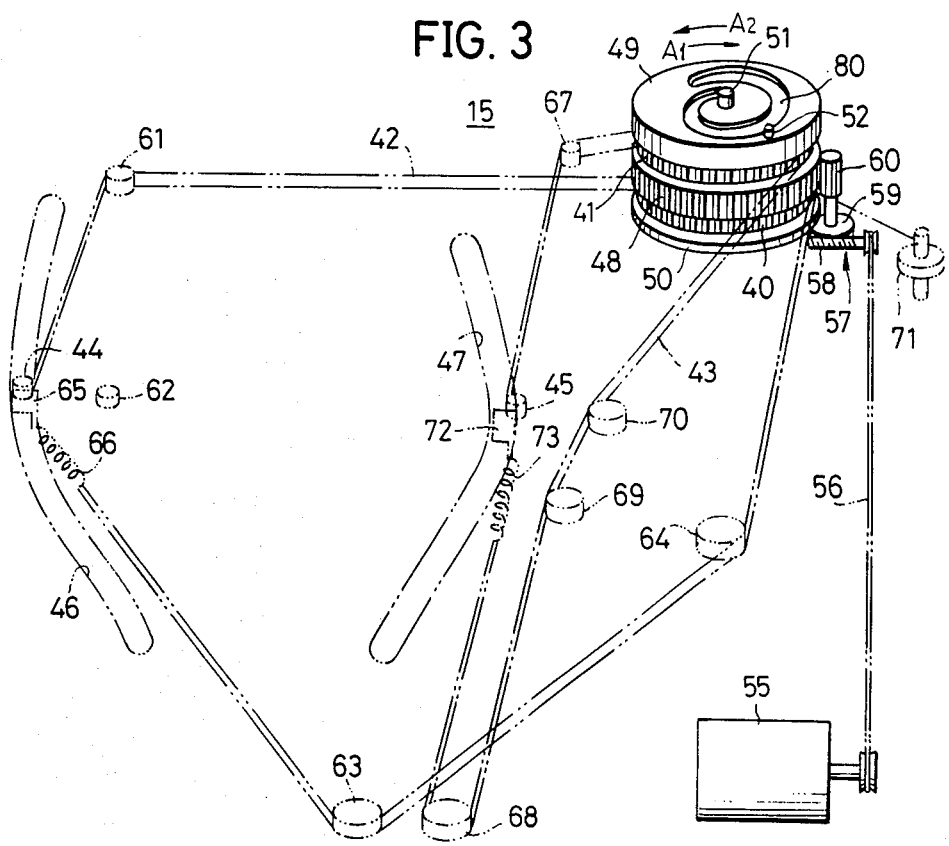
FIG. 3 is a perspective view showing the tape loading device in the apparatus shown in FIG. 1.

The tape loading mechanism 15 in the apparatus shown in FIGS. 1 and 2, is shown in FIG. 3. Timing gears 40 and 41 respectively rotate to drive timing belts 42 and 43 in the tape loading mechanism 15. When the timing belts 42 and 43 are driven to travel, loading poles 44 and 45 respectively move from original positions indicated in FIG. 1 to loading completed positions indicated in FIG. 2, along guide grooves 46 and 47.

As shown in FIGS. 3, and 6 through 9, the timing gear 40 is sandwiched between a central main gear 48 and a lowermost rotary angle detecting disc 50, and the timing gear 41 is sandwiched between the main gear 48 and an uppermost cam disc 49. The positional relationship is such that the height position of the main gear corresponds to the height position of the chassis 11, and the timing gears 40 and 42 are respectively at height positions below and above the height position of the chassis 11. The timing gears 40 and 41 are rotatably fitted coaxially around a shaft 51. Accordingly, the timing gears 40 and 41 are arranged together at the same position on the chassis 11 (at the top right near the corner as shown in FIG. 1 according to the present embodiment). Therefore, there is no need to provide independent spaces in the plan view for the respective timing gears 40 and 41, and as a result, the overall size of the recording and/or reproducing apparatus 10 can be reduced.

The cam disc 49 and the rotary angle detecting disc 50 are connected to the main gear 48 through a pin 52. Further, the timing gears 40 and 41 are connected to the pin 52 through coil springs 53 and 54. Accordingly, the cam disc 49, rotary angle detecting disc 50, and timing gears 40 and 41 can rotate substantially unitarily with the main gear 48. The pin 52 passes through respective fan-shaped holes 40a and 41a of the timing gears 40 and 41, and is movable along the peripheral direction of these timing gears 40 and 41. In addition, the shaft 51 is vertically fixed in a state where an upper end thereof is supported by a mounting plate 91 and a lower end thereof is supported by a supporting bracket 180 which is fixed to the lower surface of the chassis 11.

Figure 7:
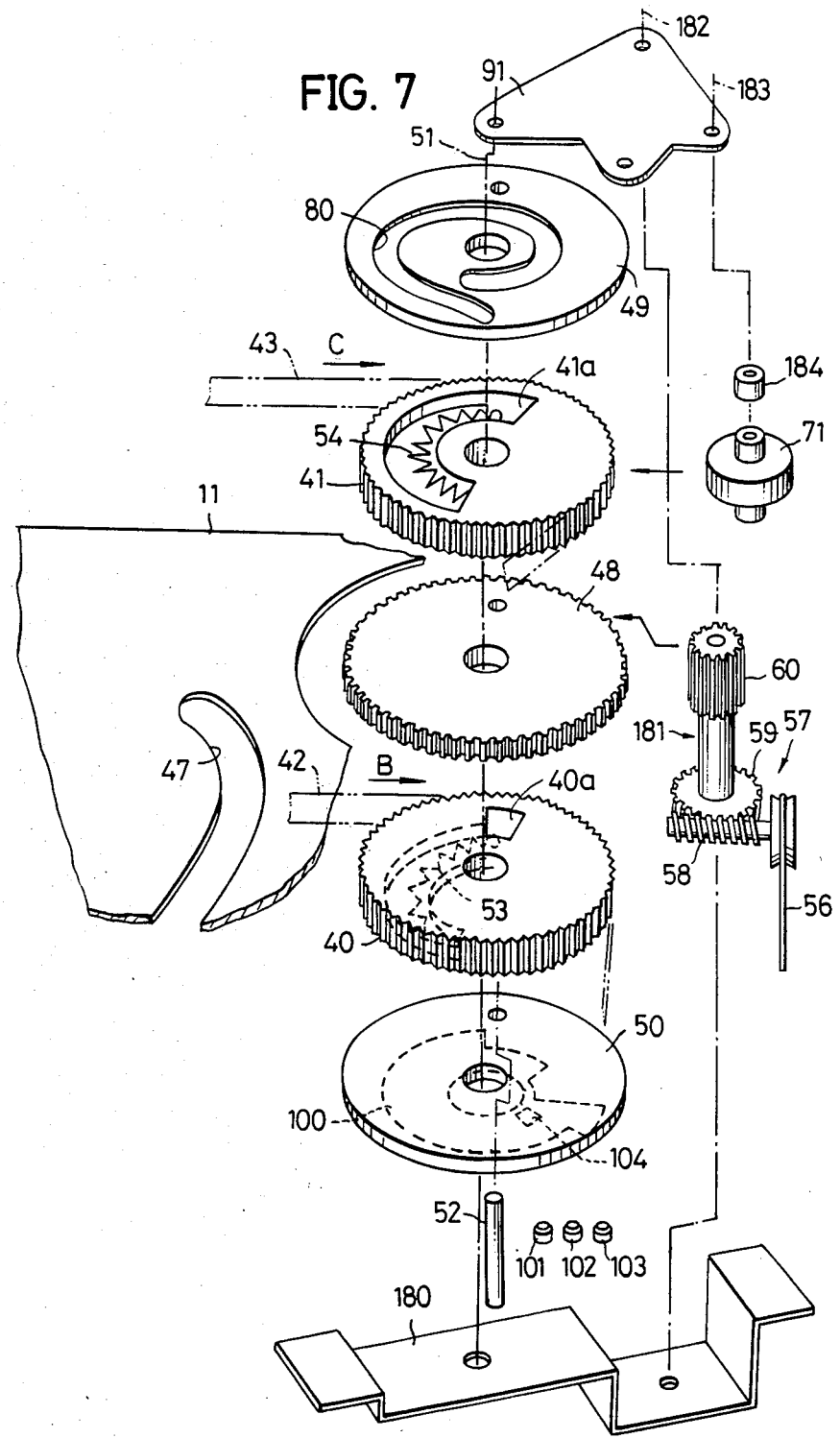
FIG. 7 is a perspective view showing the mechanism part shown in FIG. 6 in a disassembled state.
Figure 8:
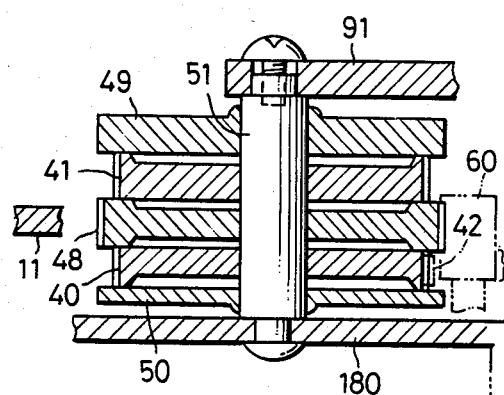
FIGS. 8, 9, and 10 respectively show cross sections of the timing belt driving mechanism part along lines VIII—VIII, IX—IX, and X—X in FIG. 1.
Figure 9:
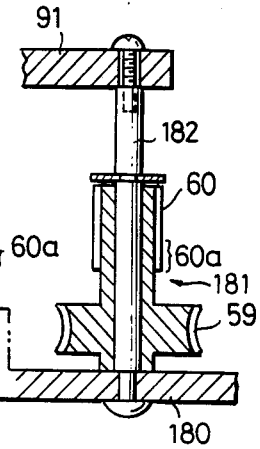

The gears 40 and 41 and the like are rotated by a loading motor 55 through a belt 56 and a gear mechanism 57 for reducing the rotational speed. Hence, the timing gears 40 and 41 are rotated clockwise (in the direction of the arrow A1) by approximately 360° upon loading of the tape, and rotated counterclockwise (in the direction of the arrow A2) by approximately 360° upon unloading of the tape. The gear mechanism 57 comprises a worm 58, a worm gear 59, and a gear 60 which meshes with the main gear 48. A gear structure 181 comprising the worm gear 59 and the gear 60 is supported by a shaft 182 which is vertically supported as shown in FIGS. 7 and 9, where an upper end of the shaft 182 is supported by the mounting plate 91 and the lower end of the shaft 182 is supported by the supporting bracket 180.

Figure 6:
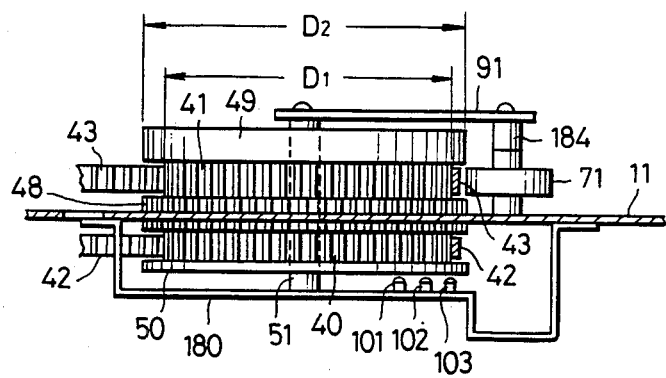
FIG. 6 is a side view showing a timing belt driving mechanism part for driving timing belts in FIG. 3.
Figure 10:
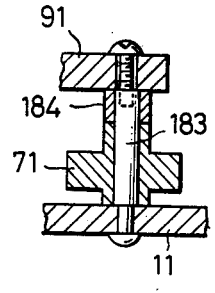

As shown in FIG. 10, a shaft 183 is vertically supported in a state where an upper end thereof is supported by the mounting plate 91 and a lower end thereof is supported by the chassis 11. As shown in FIGS. 6, 7, and 10, a belt escape preventing roller 71 for preventing the belt from escaping, is supported by the shaft 183 together with a position restricting sleeve 184.

Because the shafts 51, 182 and 183 are commonly mounted on the single mounting plate 91, distances between the shafts 51, 182, and 183 can accurately be determined, and the shafts 51, 182, and 183 can be rigidly maintained. Hence, the meshing state between the gear 60 and the main gear 48, and the position of the roller 71 with respect to the timing gear 40, are stably maintained to the same state as upon assembly, even after the tape loading mechanism 15 is operated numerous times.

The timing belt 42 is extended along the timing gear 40 and gears 61, 62, 63, and 64. One end of the timing belt 42 is directly connected to a support 65, and the other end of the timing belt 42 is connected to the same support 65 through a coil spring 66, to form a loop below the chassis 11. On the other hand, the other timing belt 43 is extended along the timing gear 41, gears 67 and 68, a guide roller 69, and a pole 70. One end of the timing belt 43 is directly connected to a support 72, and the other end of the timing belt 43 is connected to the same support 72 through a coil spring 73, to form a loop above the chassis 11. The supports 65 and 72 are respectively fitted within the guide grooves 46 and 47, so that the supports 65 and 72 respectively are movable to slide along the guide grooves 46 and 47. The loading pole 44 and a slant pole 74 are embeddedly provided on the support 65. On the other hand, the loading pole 45 and a slant pole 75 are embeddedly provided on the support 72.

The extent to which the lower surface of the chassis 11 is used is originally relatively small, and there are unused spaces which may be used. The timing belt 42 effectively uses the originally unused space. That is, the timing belt 42 is provided without requiring additional space exclusively for the timing belt 42. Accordingly, the planes on which the timing belts 42 and 43 are provided are different, however, the overall height of the recording and/or reproducing apparatus 10 is not increased by this arrangement of the timing belts 42 and 43.

A cam groove 80 is formed in the cam disc 49. An audio and control head 81 and a pinch roller 82 are moved as will be described hereinafter, by the rotation of the above cam disc 49. Before the tape is loaded, the head 81 and the pinch roller 82 respectively are at positions indicated in FIG. 1. That is, the head 81 is at a position receded from the guide groove 47 so as not to interfere with the tape loading operation, and the pinch roller 82 is at a position remote from the cassette loading part.

Figure 13A:
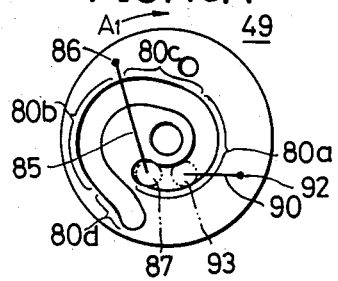
FIGS. 13A and 13B respectively are plan views showing a cam disc before tape loading and after tape loading.
Figure 13B:
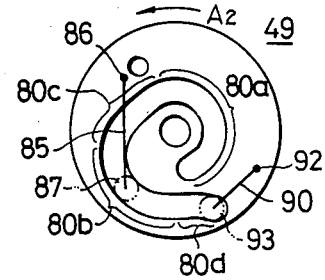
Figure 14:
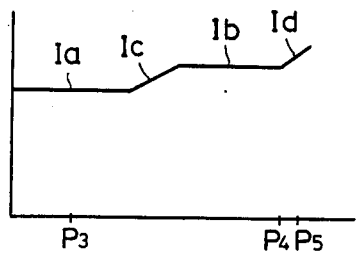
FIG. 14 is a graph showing a cam line of a cam groove in the cam disc shown in FIG. 13A.

FIG. 13A shows a rotary state of the cam disc 49 before the tape is loaded, and FIG. 13B shows a rotary state of the cam disc 49 after the tape is loaded. FIG. 14 is a graph showing a cam line of the cam groove 80. As seen from FIG. 14, the cam groove 80 comprises an inner circular part 80a (Ia), an outer circular part 80b (Ib), a radius increasing part 80c (Ic) connecting the inner and outer circular parts 80a and 80b, and a radius increasing part 80d (Id) extending from the outer circular part 80b.

As shown in FIGS. 15 and 16, the head 81 is mounted at a tip end of a support arm 84 which is pivotally supported on a shaft 83. An assisting arm 85 is pivotally supported by a pin 86 on the support arm 84, and a hanging pin 87 is provided at a tip end of the assisting arm 85. The pin 87 fits within the cam groove 80. In addition, a pin 88 of the assisting arm 85 fits within a longitudinal hole 84a of the support arm 84. A torsion spring 89 is provided between the support arm 84 and the assisting arm 85, and the spring 89 urges the assisting arm 85 counterclockwise.

A bell crank lever 90 is pivotally supported by a pin 92 on the mounting plate 91, and a pin 93 of the lever 90 fits within the cam groove 80. The rotary angle detecting disc 50 shown in FIG. 3 comprises a reflecting plate 100 adhered at a bottom thereof, as shown in FIGS. 7 and 17. Three light-detecting elements 101, 102, and 103 are fixed onto a base opposing the reflecting plate 100. Each light-detecting element comprises a light-emitting element and a light-receiving element arranged adjacent to each other and formed as a unit. The reflecting plate 100 and each of the light-detecting elements 101 through 103 cooperate, to detect the rotary angular position of the detecting disc 50, that is, the rotary angular positions of the cam disc 80 and the timing gears 40 and 41. The elements 101 through 103 are arranged linearly along a radial direction of the detecting disc 50, and respectively scan the bottom surface of the detecting disc 50 along tracks T1, T2, and T3 shown in FIG. 17 upon rotation of the detecting disc 50. When the elements 101 through 103 oppose the reflecting plate 100, the light-receiving elements of the elements 101 through 103 respectively receive light reflected by the reflecting plate 100, and these light-receiving elements produce an output level "1". On the other hand, the light-receiving elements produce an output level "0" when the elements 101 through 103 no longer oppose the reflecting plate 100 and there is no reflected light to the light-receiving elements from the reflecting plate 100.

FIG. 17 shows a rotary position of the detecting disc 50 before the tape is loaded. In FIG. 17, an unloading completed position (position before the tape is loaded) is indicated by P1, a position immediately before unloading is completed (position immediately before starting of the tape loading operation) by P2, a position where tape end detecting device starts to operate by P3, a pause mode position by P4, and a tape loading completed position by P5. If these positions P1 through P5 are shown in terms of positions of the pin 87 fitted within the cam groove 80 of the cam disc 49 or positions of the pin 93 within the cam groove 80, a graph shown in FIG. 14 can be obtained. In FIG. 14, the position P3 indicates a position with respect to the pin 87, and the positions P4 and P5 indicate positions with respect to the pin 93.

The reflecting plate 100 has a predetermined shape, so that the reflecting plate 100 exists at the positions P2 through P5 excluding the position P4 on the track T1, at the position P3 through P5 on the track T2, and at the position P5 on the track T3, and comprises a blank 104. The relationships between the rotary position of the rotary angle detecting disc 50 and the output levels of the elements 101 through 103 become as shown in the following table.

TABLE

| Rotary Element | Element | | |
|---|---|---|---|
| | Element 101 | Element 102 | Element 103 |
| P1 | 0 | 0 | 0 |
| P3 | 1 | 1 | 0 |
| P4 | 0 | 1 | 0 |
| P5 | 1 | 1 | 1 |

The signals from each of the elements 101 through 103 are applied to a micro-computer, and the micro-computer controls the operation of the recording and-/or reproducing apparatus 10 according to the combinations of the signals from the elements 101 through 103. That is, the unloading operation is stopped when the signals from the elements 101 through 103 are [000], the tape loading operation is stopped when the signals are [111], and the pause mode is confirmed when the signals are [010].

Next, description will be given with respect to the tape loading operation of the recording and/or reproducing apparatus 10.

As shown in FIG. 1, the tape cassette 20 is inserted into the cassette housing 38 from the side of the lid 23. Then, the tape cassette 20 is brought downwards together with the housing 38, and is loaded into the cassette loading part 13. In this state, a supply reel driving shaft 120 engages with the supply reel 26. Moreover, the loading pole 44, the slant pole 74, and a tension pole 121 respectively enter within the cutout 33, the loading pole 45 and the slant pole 75 respectively enter within the cutout 34, and a capstan 122 relatively enters within the cutout 35. Furthermore, an engaging member 123 engages with the lid 23 to open the lid 23 as shown in FIG. 5, accompanied by the downward movement of the tape cassette 20. In addition, the gear part 30 of the take-up reel 27 meshes with a small-diameter gear 124a of a tape take-up gear 124.

When a recording or reproducing operation is then carried out, the motor 55 is started, and the timing gears 40 and 41, the cam disc 49, and the rotary angle detecting disc 50 rotate clockwise (in the direction A1). The timing belts 42 and 43 respectively travel in the directions of arrows B and C due to the rotation of the timing gears 40 and 41, and the supports 65 and 72 respectively move along the guide grooves 46 and 47 due to the pulling action by the belts 42 and 43. At this point, the poles 44 and 45 intercept and engage with the magnetic tape 21, to draw the magnetic tape 21 out of the tape cassette 20. The support 65 moves pushing an impedance roller 125 away, and the loading pole 44 is finally pushed against and held by a stopper 126. The support 72 moves passing in front of the audio and control head 81 which is at the receded position, and the loading pole 45 is finally pushed against and held by a stopper 127.

A diameter D2 of the main gear 48, cam disc 49, and the rotary angle detecting disc 50 is larger than a diameter D1 of the timing gears 40 and 41. Outer peripheral parts of the main gear 48 and the cam disc 49 acts as flanges of the timing gear 41, and outer peripheral parts of the main gear 48 and the rotary angle detecting disc 50 act as flanges of the timing gear 40, to restrict the movements of the belts 42 and 43 along their width direction. In addition, the roller 71 restricts the movement of the timing belt 43 along the outer peripheral direction of the gear 41. Furthermore, as indicated by a two-dot chain line in FIG. 8, a lower half 60a of the gear 60 which meshes with the main gear 48, restricts the movement of the timing belt 42 along the outer peripheral direction of the gear 40. Accordingly, the timing belts 42 and 43 travel stably without escaping from the respective timing gears 40 and 41.

Figure 11:
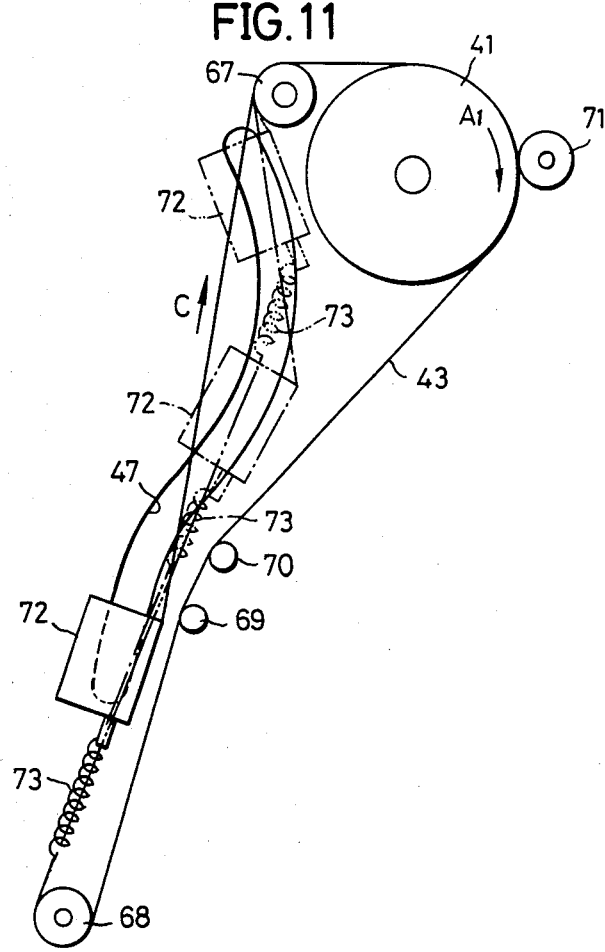
FIG. 11 is a diagram showing the changing state of a timing belt provided above a chassis as the loading operation advances.
Figure 12:
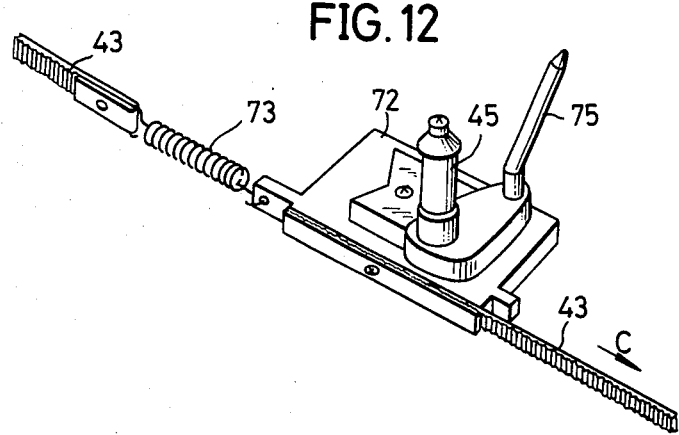
FIG. 12 is a perspective view showing a loading pole support, and connecting states of timing belts and coil springs with respect to the loading pole support.

Moreover, the guide groove 47 and the path of the timing belt 43 along the groove 47 (the path of the timing belt 43 between the gears 67 and 68) are not parallel, and the guide groove 47 and the path of the timing belt 43 intersect in the plan view as shown in FIG. 11. Hence, the path of the timing belt 43 between the gears 67 and 68 changes from the path indicated by a solid line in FIG. 11, and assumes a path indicated by a one-dot chain line in FIG. 11 during the tape loading operation, and assumes a path indicated by a two-dot chain line in FIG. 11 upon completion of the tape loading operation. The entire length of the closed loop constituted by the belt 43, coil spring 73, and the support 72 increases from its initial length as the tape loading operation is carried out and completed. This increase in the length of the closed loop is permitted due to the expansion of the coil spring 73. Thus, the belt 43 travels accompanying expansion of the coil spring 73, and the support 72 can move smoothly along the guide groove 47.

Similarly, the other timing belt 42 travels accompanying expansion of the coil spring 66, and the support 65 can travel smoothly along the guide groove 46.

Further, during loading of the tape, the supports 65 and 72 are pulled directly by the belts 42 and 43, and not through the coil springs. Hence, the loading poles 44 and 45 can move smoothly without accompanying pulsating movements due to the coil springs, and the tape can be stably drawn out of the cassette 20.

The main gear 48 rotates angularly accompanying expansion of the coil springs 53 and 54 shown in FIG. 7, exceeding a predetermined angle through which the timing gears 40 and 41 can rotate, that is, the main gear 48 undergoes a so-called over-rotation. For this reason, the distances along which the timing belts 42 and 43 must travel become slightly different according to the differences in the shape of the guide grooves 46 and 47. However, no inconveniences are introduces due to this slight difference. Thus, the timing belt 42 positively travels for a distance so as to move the loading pole 44 up to a position where the loading pole engages with the stopper 126. Similarly, the timing belt 43 positively travels for a distance so as to move the loading pole 45 up to a position where the loading pole engages with the stopper 127. In addition, in a state where the main gear 48 is stopped, the timing gears 40 and 41 are respectively urged to rotate clockwise by tension introduced due to the expansion of the coil springs 53 and 54, and the loading poles 44 and 45 are pushed against the respective stoppers 126 and 127.

After the loading pole 45 passes in front of the audio and control head 81, the pin 87 is guided by the cam groove 80 to move towards the outer periphery of the cam disc 49, by the rotation of the cam disc 49. Hence, the support arm 84 and the assisting arm 85 unitarily rotate clockwise, and the head 81 approaches the magnetic tape 21 which is drawn outside the tape cassette 20, to finally make contact with the magnetic tape 21. As shown in FIG. 2, the assisting arm 85 rotates independently of the support arm 84 at the final stage, and the support arm 84 is urged clockwise by the force of the spring 89. Accordingly, a stopper (not shown) at the lower surface of the support arm 84 pushes against the pole 70 on the chassis 11, to position the head 81 at a predetermined position.

Further, by the rotation of the cam disc 49, the pin 93 of the bell crank lever 90 is guided by the cam groove 80 to rotate the lever 90 counterclockwise about the pin 92 as shown in FIG. 2. Moreover, a pinch roller support arm 130 is rotated counterclockwise about a shaft 131 through connection levers 128 and 129, and the pinch roller 82 pushes against the capstan 122. The pushing force of the pinch roller 82 with respect to the capstan 122 is produced by a force exerted by a coil spring 132 provided between the levers 128 and 129.

According to the rotation of the support arm 84, an L-shaped lever 134 rotates about a shaft 135 through a lever 133. Thus, a wire 136 is loosened, and an L-shaped lever 137 is rotated clockwise by a spring 138. The wire 136 is guided by a guide roller 139, and is provided along the peripheral edge of the apparatus in an L-shape. The levers 134 and 137 are connected by this wire 136. When the lever 137 rotates, a tension arm 140 rotates counterclockwise about a shaft 142 due to a spring 141, and the tension pole 121 reaches its operating position. In this state, tension is introduced in a brake band 143. In addition, a plunger 144 is actuated, and a slide plate 145 moves leftwards in FIG. 2. As a result, brake shoes 146 and 147 respectively separate from the supply reel driving shaft 120 and the tape take-up gear 124, to cancel the braking action.

Therefore, the recording and/or reproducing apparatus 10 assumes a state shown in FIG. 2. In this state, the magnetic tape 21 which is drawn out from the supply reel 26 makes contact with the impedance roller 125, after making contact with a guide pole 148, the tension pole 121, and a full-width erasing head 149. The impedance roller 125 and the full-width erasing head 149 are held in position at predetermined positions by a coil spring 150 and a stopper pin 151. The magnetic tape 21 further makes contact with the cylindrical surface of the guide drum 12 having rotary video heads, in a spiral manner, between the poles 74 and 75. While the magnetic tape 21 makes contact with and travels with respect to the guide drum 12, a video signal is recorded onto or reproduced from the magnetic tape 21 by the rotary video heads.

After making contact with the guide drum 12, the magnetic tape 21 makes contact with the audio and control head 81, and is guided by a guide pole 152. Hence, the magnetic tape 21 is driven in a state pinched between the pinch roller 82 and the capstan 122, and enters within the tape cassette 20 to be taken up by the take-up reel 27.

The capstan 122 is rotated by a capstan motor 153. Moreover, due to the clockwise rotation of a motor 154, an idler 155 moves and pushes against an intermediate gear 156. Thus, the motor 154 rotates the take-up reel 27 through the idler 155, the intermediate gear 156, and the gear 124. As a result, the take-up reel 27 is rotated clockwise to take-up the magnetic tape 21.

When a pause operation is carried out during the recording or reproducing mode, the loading motor 55 rotates in a reverse direction. Thus, the cam disc 49 and the rotary angle detecting disc 50 undergo slight counterclockwise angular rotation independently of the timing gears 40 and 41. The motor 55 stops rotating at a point in time when the signals [010] are obtained from the elements 101 through 103. The pinch roller 82 separates from the capstan 122 as indicated by a two-dot chain line in FIG. 2 due to the rotation of the cam disc 49, and the apparatus 10 accordingly assumes the pause mode.

On the other hand, when a stop operation is carried out during the recording or reproducing mode, the loading motor 55 rotates in the reverse direction, and each of the mechanisms which operated during the tape loading operation then operates with a reverse sequence in an opposite direction to carry out a tape unloading operation. Thus, the magnetic tape 21 which is drawn outside the tape cassette 20 is taken up by the take-up reel 27 and becomes accommodated within the tape cassette 20. The loading motor 55 stops rotating at a point in time when the signals [000] are obtained from the elements 101 through 103.

During a tape rewinding mode, the motor 154 rotates counterclockwise, and the idler 155 makes contact with the supply reel driving shaft 120. In this state, the motor 154 rotates the supply reel driving shaft 120.

Further, the present invention is not limited to these embodiments, but various variations and modifications may be made without departing from the scope of the present invention.

What is claimed is:

1. A tape loading device in a recording and/or reproducing apparatus comprising a guide drum having heads for recording and/or reproducing signals onto a tape, said tape loading device comprising:

a first belt arranged along a first belt path which has a first section extending between said guide drum and a cassette accommodating said tape;

a second belt arranged along a second belt path which has a second section extending between said guide drum and said cassette;

driving means for driving said first and second belts so that each of said first and second belts in the respective first and second sections travels toward said guide drum during a tape loading mode and travels toward said cassette during a tape unloading mode;

a reflecting plate which rotates unitarily with said driving means so as to represent a rotary angle of said driving means;

a detector means comprising a light emitting element and a light receiving element arranged adjacent to each other for emitting a light to said reflecting plate and receiving the light which is reflected by said reflecting plate so as to detect the rotary angle of said driving means;

a pair of tape guide means movable in response to the travel of said first and second belts for intercepting the tape within said cassette and moving to predetermined positions in the vicinity of said guide drum during the tape loading mode, to guide the tape at said predetermined positions so that the tape travels along a predetermined tape path with respect to said guide drum for a predetermined range; and guide path means for guiding said pair of tape guide means so that said tape guide means move along predetermined moving paths, said driving means comprising a first rotary body having said first belt fit around its outer periphery to cause said first belt to travel, a second rotary body having said second belt fit around its outer periphery to cause said second belt to travel, said first and second rotary bodies being provided coaxially, a driving rotary body provided coaxially between said first and second rotary bodies for rotating substantially unitarily said first and second rotary bodies, a driving force generating means for rotating said driving rotary body so that said first, second and driving rotary bodies rotate in one rotational direction during said tape loading mode and in an opposite rotational direction during said tape unloading mode, a first spring member connected between said first rotary body and said driving rotary body, and a second spring member connected between said second rotary body and said driving rotary body, said driving rotary body over-rotating after said pair of tape guide means reach said predetermined positions during said tape loading mode so that said first and second spring members are deformed and urge said first and second rotary bodies in said one rotational direction, the rotation of said driving rotary body being stopped when said detector detects a specific rotary angle of said driving means.

2. A tape loading device as claimed in claim 1 in which said driving means is arranged at a position beside said guide drum in a plan view from above of said recording and/or reproducing apparatus.

3. A tape loading device as claimed in claim 1 in which said first and second rotary bodies of said driving means are provided with a height positional relationship so that said first rotary body opposes an upper surface of a chassis of said recording and/or reproducing apparatus and said second rotary body opposes a lower surface of said chassis, and said first and second belts are arranged so that said first belt is provided above said chassis and said second belt is provided below said chassis.

4. A tape loading device as claimed in claim 3 in which each of said first and second belts has two ends, one of the respective ends of said first and second belts being directly connected to said respective tape guide means and the other of said respective ends of said first and second belts being connected to said respective tape guide means via resilient members to constitute a loop, and said resilient members expanding and contracting upon the movement of said tape guide means along said guide path means, to vary the entire length of said loop according to deviations of said first and second sections of said respective first and second belt paths with respect to said guide path means.

5. A tape loading device as claimed in claim 4 in which tension is not introduced in said resilient members during movement of said first and second belts upon said tape loading mode, and tension is introduced in said resilient members during movement of said first and second belts upon said tape unloading mode.

6. A tape loading device as claimed in claim 1 in which said driving means further comprises first preventing means for preventing said first belt from escaping from said first rotary body, and second preventing means for preventing said second belt from escaping from said second rotary body.

7. A tape loading device as claimed in claim 1 in which said driving means further comprises a cam disc coaxially provided with said first and second rotary bodies, said cam disc undergoing rotation to operate a mechanism which moves a pinch roller and pushes the pinch roller against a capstan.

8. A tape loading device as claimed in claim 1 in which said driving means further comprises a cam disc coaxially provided with said first and second rotary bodies, said cam disc undergoing rotation to operate a mechanism which moves an audio and control head to a position where the audio and control head makes contact with said tape.

9. A tape loading device as claimed in claim 1 in which said driving means further comprises a cam disc coaxially provided with said first and second rotary bodies, said cam disc undergoing rotation to operate a mechanism which moves a pinch roller and pushes the pinch roller against a capstan and a mechanism which moves an audio and control head to a position where the audio and control head makes contact with said tape.

10. A tape loading device as claimed in claim 1 in which said driving means further comprises a cam disc having a diameter which is larger than the diameter of said first rotary body and which is provided coaxially above said first rotary body for operating mechanisms related to the tape loading operation by rotating unitarily with said driving rotary body, said driving rotary body having a diameter which is larger than diameters of said first and second rotary bodies, parts of said cam disc and said driving rotary body projecting from the outer periphery of said first rotary body and acting as flanges to prevent an escape of said first belt from said first rotary body, said reflecting plate being provided on a disc which has a diameter that is larger than the diameter of second rotary body so that parts of said disc and said driving rotary body projecting from the outer periphery of said second rotary body act as flanges to prevent an escape of said second belt from said second rotary body.

11. A tape loading device as claimed in claim 10 in which said driving means further comprises a first shaft for coaxially supporting said first and second rotary bodies, said driving rotary body, said cam disc, and said disc, a second shaft for supporting a driving gear which meshes with and rotates said driving rotary body, and a third shaft for supporting a member which restricts movements of said first and second belts along outer peripheral directions of said first and second rotary bodies, said first, second, and third shafts being supported at independent positions on a single support plate.

* * * * *